United States Patent
Metge et al.

(10) Patent No.: US 11,619,380 B2
(45) Date of Patent: Apr. 4, 2023

(54) CONSTANT VOLUME COMBUSTION SYSTEM

(71) Applicant: SAFRAN, Paris (FR)

(72) Inventors: Pierre Jean-Baptiste Metge, Moissy-Cramayel (FR); Eric Conete, Moissy-Cramayel (FR); Gautier Mecuson, Moissy-Cramayel (FR); Matthieu Leyko, Moissy-Cramayel (FR)

(73) Assignee: SAFRAN, Paris (FR)

( * ) Notice: Subject to any disclaimer, the term of this patent is extended or adjusted under 35 U.S.C. 154(b) by 440 days.

(21) Appl. No.: 16/611,393

(22) PCT Filed: May 15, 2018

(86) PCT No.: PCT/FR2018/051169
§ 371 (c)(1),
(2) Date: Nov. 6, 2019

(87) PCT Pub. No.: WO2018/211209
PCT Pub. Date: Nov. 22, 2018

(65) Prior Publication Data
US 2020/0166207 A1 May 28, 2020

(30) Foreign Application Priority Data
May 16, 2017 (FR) ...................................... 1754286

(51) Int. Cl.
F02K 7/06 (2006.01)
F23C 15/00 (2006.01)
(Continued)

(52) U.S. Cl.
CPC .............. *F23C 15/00* (2013.01); *F01L 3/205* (2013.01); *F01L 2301/02* (2020.05); *F02C 5/02* (2013.01); *F02C 5/12* (2013.01); *F02K 7/06* (2013.01)

(58) Field of Classification Search
CPC .... F02C 5/02; F02C 5/12; F23C 15/00; F02K 7/06; F01L 3/205
See application file for complete search history.

(56) References Cited

U.S. PATENT DOCUMENTS 3,177,663 A  4/1965 Black
5,090,891 A  2/1992 Hemsath
(Continued)

FOREIGN PATENT DOCUMENTS

CN  101675216 A  3/2010
CN  103370523 A  11/2015
(Continued)

OTHER PUBLICATIONS

Ma et al., "Experimental Investigation of a Reed Valve on the Performance of a Pulse Detonation Engine", Intl. Journal Turbo Jet-engines, vol. 30, Issue 4, 2013, pp. 375-381. (Year: 2013).*

(Continued)

*Primary Examiner* — Lorne E Meade
(74) *Attorney, Agent, or Firm* — Pillsbury Winthrop Shaw Pittman LLP

(57) ABSTRACT

A constant volume combustion system includes at least one combustion chamber having at least one admission port and an exhaust port. The system also includes at least one elastically deformable tongue made of ceramic matrix composite material forming an air admission valve, the tongue being present inside the chamber and being positioned facing the admission port, the tongue having a first end that is stationary relative to an inside wall of the chamber and a (Continued)

second end, opposite from the first end, the second end being free and movable relative to the inside wall.

3 Claims, 2 Drawing Sheets

(51) Int. Cl.
*F01L 3/20* (2006.01)
*F02C 5/02* (2006.01)
*F02C 5/12* (2006.01)

(56) References Cited

U.S. PATENT DOCUMENTS

| | | | |
|---|---|---|---|
| 7,631,487 B2 * | 12/2009 | DiSalvo | F02K 9/94 |
| | | | 60/204 |
| 8,960,148 B2 | 2/2015 | McGinnis | |
| 8,974,891 B2 * | 3/2015 | Riedell | C04B 37/008 |
| | | | 156/289 |
| 9,279,503 B2 * | 3/2016 | DiSalvo | F23C 3/00 |
| 2010/0126442 A1 | 5/2010 | Lou | |

FOREIGN PATENT DOCUMENTS

| | | |
|---|---|---|
| EP | 0 595 384 A1 | 5/1994 |
| JP | H03-227207 A | 10/1991 |

OTHER PUBLICATIONS

Fukunari et al., "Air-Breathing System Using Reed Valve for Pulse Detonation Microwave Rocket", Trans. JSASS Aerospace Tech., vol. 14, 2016, pp. 1-7. (Year: 2016).*
International Search Report as issued in International Patent Application No. PCT/FR2018/051169, dated Aug. 3, 2018.
Simpson, B., "The Argus V1 Pulsejete," Jan. 2003, XP 002777721, Retrieved from the Internet: URL: http://aardvark.co.nz/pjet/argusv1.shtml, [retrieved on Dec. 20, 2017], 2 pages.
Darling, D., "V-1," Jul. 2012, XP002777722, Retrieved from the Internet: URL: http://www.daviddarling.info/encyclopedia/V/V-1.html, [retrieved on Dec. 20, 2017], 3 pages.

* cited by examiner

CONSTANT VOLUME COMBUSTION SYSTEM

CROSS-REFERENCE TO RELATED APPLICATIONS

This application is the U.S. National Stage of PCT/FR2018/051169, filed May 15, 2018, which in turn claims priority to French patent application number 17 54286 filed May 16, 2017. The content of these applications are incorporated herein by reference in their entireties.

The invention relates to a constant volume combustion system comprising one or more combustion chambers, each being provided with at least one elastically deformable tongue forming an air admission valve.

BACKGROUND OF THE INVENTION

A combustion chamber is fed with air under pressure and includes a fuel injector that is suitable for injecting fuel into the admitted air stream in order to give rise to combustion, thereby causing hot gas to be emitted. The hot gas may then be used for driving a turbine. The combustion chamber includes at least one admission port through which the air is introduced into the chamber, and an exhaust port through which the hot gas is discharged out from the chamber. Combustion chambers are described in particular in Document U.S. Pat. No. 5,090,891

The combustion chamber may operate with a Humphrey cycle, i.e. with a constant volume combustion (CVC) cycle. The constant volume combustion cycle comprises a combustion period (referred to as the "combustion stage"), an exhaust period (referred to as the "exhaust stage"), and a period of admitting fresh air and sweeping out burnt gas (referred to as the "sweeping stage"). During the combustion stage, the admission and exhaust ports are both closed. During the exhaust stage, the admission port is closed and the exhaust port is open. During the sweeping stage, the admission and exhaust ports are both open.

The combustion chamber is thus commonly provided with an admission and exhaust mechanism that enables the opening and the closing of the admission and exhaust ports to be controlled so as to perform the three above-mentioned stages of the cycle.

Nevertheless, there exists a need to simplify existing mechanisms for admitting air into combustion chambers operating with a constant volume combustion cycle.

OBJECT AND SUMMARY OF THE INVENTION

To this end, in a first aspect, the invention provides a constant volume combustion system comprising at least one combustion chamber having at least one admission port and an exhaust port;

the system being characterized in that it includes at least one elastically deformable tongue made of ceramic matrix composite material forming an air admission valve, the tongue being present inside the chamber and being positioned facing the admission port, the tongue having a first end that is stationary relative to an inside wall of the chamber and a second end, opposite from the first end, the second end being free and movable relative to the inside wall.

The invention proposes a simple solution for managing the admission of air into the combustion chamber by using an elastically deformable tongue having one end that is stationary and its other end that is free. During the combustion stage, pressure increases inside the inside volume, thereby causing a force to be applied against the tongue that is sufficient to press it against the admission port so as to shut it. Once the combustion stage has been completed, the exhaust port is opened, thereby contributing to reducing pressure inside the chamber. The force applied against the tongue is thus reduced, and the tongue then moves away from the admission port. This separation of the tongue enables fresh air to be admitted coming from the outside medium, and enables the sweeping stage to be performed.

The elastically deformable tongue thus makes it possible to manage air admission in passive manner during the three stages of the constant volume combustion cycle. The tongue constitutes a mechanism for controlling air admission that is simple, light in weight, and compact. The fact that the tongue is made of ceramic matrix composite (CMC) material enables it to perform its function in spite of the high temperatures and pressures that it encounters in operation in the combustion chamber.

In an embodiment, the first end of the tongue is fastened to the inside wall of the chamber.

In an embodiment, the tongue is defined by at least one slot formed in an air admission sleeve positioned inside the chamber.

In an embodiment, the chamber comprises a plurality of admission ports, each of the admission ports facing an elastically deformable tongue.

In an embodiment, the chamber is defined by a circumferential wall and the admission ports are formed through the circumferential wall.

BRIEF DESCRIPTION OF THE DRAWINGS

Other characteristics and advantages of the invention appear from the following description of particular implementations of the invention, given as nonlimiting examples, and with reference to the accompanying drawings, in which.

DETAILED DESCRIPTION OF EMBODIMENTS

Figure 1:
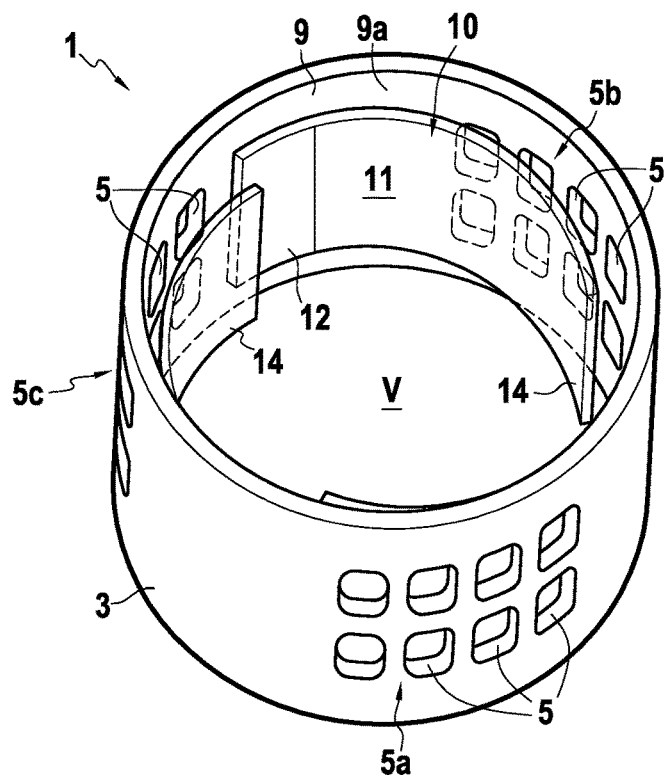
FIG. 1 shows, in diagrammatic and fragmentary manner, a combustion chamber suitable for use in the context of the invention.

The example shown in FIGS. 1 to 5 relates to a combustion chamber in which the air admission valve is in the form of a tongue 10 that is fastened at one of its ends to the inside wall 9a of the combustion chamber.

The combustion chamber 1 comprises an enclosure 3 that defines an inside volume V. The inside volume V is defined and surrounded by the enclosure 3. In this example, the enclosure 3 is substantially cylindrical in shape. More generally, the enclosure 3 may be axisymmetric in shape. Nevertheless, other shapes can be envisaged for the enclosure 3, e.g. such as the shape of a parallelepiped.

The enclosure 3 comprises a circumferential wall 9 that is situated around the inside volume V of the chamber 1. The enclosure 3 further comprises a first end wall 4 and a second end wall 6, shown in FIGS. 2 to 5. The first end wall 4 and the second end wall 6 both define the inside volume V. The first end wall 4 and the second end wall 6 are situated at opposite ends of the circumferential wall 9.

The combustion chamber 1 is provided with a fuel injector 13 that is placed on the first end wall 4 in this example. In known manner, combustion may be initiated either by a spark igniter (spark plug), or by a thermal gas igniter (not shown).

In the example shown, the enclosure 3 defines a plurality of admission ports 5. Nevertheless, it would not go beyond the ambit of the invention for the chamber to have only a single admission port. In this example, the admission ports 5 are arranged through the circumferential wall 9. By positioning the admission ports 5 in this way around the inside volume V, fresh air is admitted into various different positions of the circumference of the chamber. This configuration improves the renewal of fresh air, increases turbulence, and thus improves the efficiency of combustion. Furthermore, such a configuration makes it possible to cool the wall of the chamber effectively by means of the admitted fresh air. Nevertheless, it would not go beyond the ambit of the invention for the admission ports 5 to be positioned other than in the circumferential wall 9.

As shown, the admission ports 5 may be distributed in a plurality of groups 5a, 5b, and 5c of admission ports 5. Each group 5a, 5b, and 5c may have a plurality of admission ports 5. In the example shown, each group 5a, 5b, and 5c comprises eight admission ports 5, and the wall 5 presents three groups 5a, 5b, and 5c. The groups 5a, 5b, and 5c may optionally be distributed regularly over circumferential wall 5.

In this example, each tongue 10 is positioned facing a plurality of admission ports 5. More precisely, each group 5a, 5b, and 5c of ports 5 faces a different tongue 10.

The tongue 10 is made of CMC material, i.e. it is made of a material comprising fiber reinforcement densified by a matrix that is made at least in part out of ceramic. The enclosure 3 may also be made of CMC material, or in a variant it may be made of metal material. In a CMC material, the fiber reinforcement may be made of carbon (C) fibers or of ceramic fibers, e.g. of silicon carbide (SiC) fibers. Fibers suitable for use in constituting the fiber reinforcement are produced by the Japanese supplier Nippon Carbon under the reference "Nicalon" or "Hi-Nicalon" or "Hi-Nicalon Type-S", or by the Japanese supplier Ube Industries under the reference "Tyranno-ZMI". By way of example, suitable carbon fibers are supplied under the name Torayca T300 3K by the supplier Toray. The fibers may be coated in a thin interface layer made of pyrolytic carbon (PyC), of boron nitride (BN), or of boron doped carbon (BC), with boron being at 5 atom percent (at %) to 20 at %, the balance being C. In a CMC material, the matrix is ceramic, at least in part. More than 50% by weight of the matrix may be constituted by a ceramic material. The matrix may be constituted by a ceramic material. By way of example, the matrix may comprise at least one silicon carbide phase. The matrix may be made in conventional manner by chemical vapor infiltration (CVI). The matrix may also be constituted, at least in part, by introducing powders, in particular powders of carbon and possibly also of ceramic, and by infiltrating with a metal composition based on silicon in the molten state, so as to form a matrix of SiC—Si type. Such a process is well known and is commonly referred to as melt infiltration (MI).

The tongue 10 is elastically deformable so as to close and re-open the admission ports 5 under the effect of the pressure variations that are encountered in the chamber 1 while it is in operation, as described below. The thin and slender shape of the tongue 10 can give it its elastically deformable nature. The tongue 10 may thus present a length that is at least three times its thickness. This length may be equal to at least five times its thickness, or even equal to at least ten times its thickness. The tongue 10 has a first end 12 that is fastened to the inside wall 9a of the enclosure 3. By way of example, the first end 12 may be fastened to the inside wall 9a by brazing. In this example, the first end 12 is fastened to the circumferential wall 9. The first and 12 is stationary relative to the inside wall 9a. The first end 12 is fastened in a zone of the inside wall 9a that does not have an admission port 5. The tongue 10 also has a second end 14 different from the first end 12, which second end is free and movable relative to the inside wall 9a. The tongue 10 has a middle portion 11 situated between the first and second ends 12 and 14, which middle portion is situated facing the admission ports 5. The tongue 10 may extend circumferentially around the inside volume V.

With reference to FIGS. 2 to 5, there follows a description of how air admission is controlled by the tongue 10.

Figure 2:
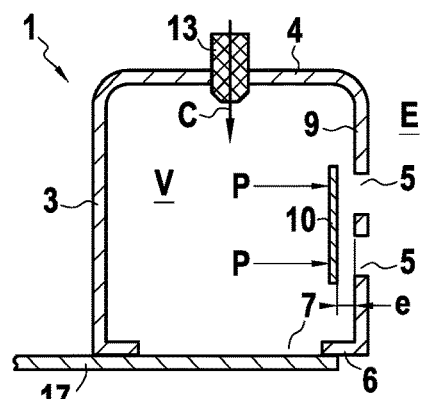
FIGS. 2 through 5 are diagrammatic and fragmentary sectional views of the FIG. 1 combustion chamber during the various stages of the constant volume combustion cycle.

FIG. 2 shows the chamber 1 at the beginning of combustion. Before the beginning of combustion, the tongue 10 is in an equilibrium position, and it is spaced apart from the admission ports 5 by a non-zero spacing e. Thus, the inside volume V is in communication with the outside letter E of the chamber 1 before the initiation of combustion. This communication takes place via the admission ports 5. Meanwhile, prior to the beginning of combustion, the exhaust port 7 is shut by a shutter 17. In this example, the exhaust port 7 is located in the second end wall 6. The exhaust port could be in some other position. In the example shown, there is only one exhaust port 7. Nevertheless, it would not go beyond the ambit of the invention for the chamber 1 to be provided with a plurality of exhaust ports 7.

Figure 3:
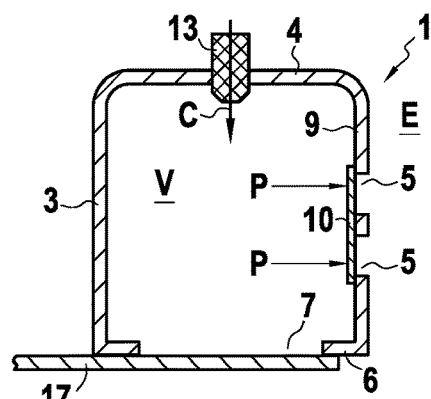
Figure 4:
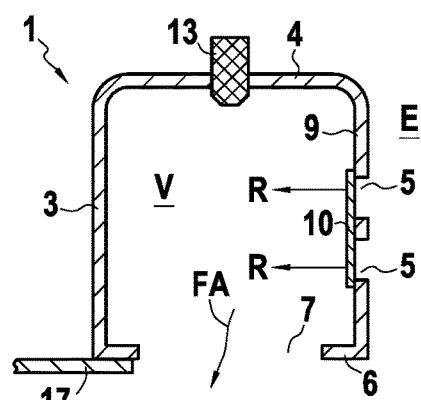

Combustion is initiated by injecting fuel (arrow C) and by ignition. Initiation of combustion leads to the pressure inside the inside volume V increasing. As a result, pressure is applied against the tongue 10 (arrows P). When the pressure inside the inside volume V reaches a threshold, a force is applied to the tongue 10 that is sufficient to press it against the admission ports 5 so as to shut them. This configuration is shown in FIG. 3, which is a diagram of the chamber as combustion continues. Under such circumstances, the middle portion 11 of the tongue 10, and possibly also its second end 14, shut the admission ports 5. In this configuration, the inside volume V is not in communication with the outside E.

When combustion comes to an end, the exhaust port 7 is opened in order to discharge the burnt gas to the outside of the chamber 1. This stage corresponds to the exhaust stage shown in FIG. 4, where the burnt gas stream leaving the chamber is represented by arrow FA. During the exhaust stage, the pressure in the inside volume V decreases, thereby decreasing the force applied against the tongue 10. The tongue 10 returns to its equilibrium position in which it is spaced apart from the admission ports (arrows R).

Figure 5:
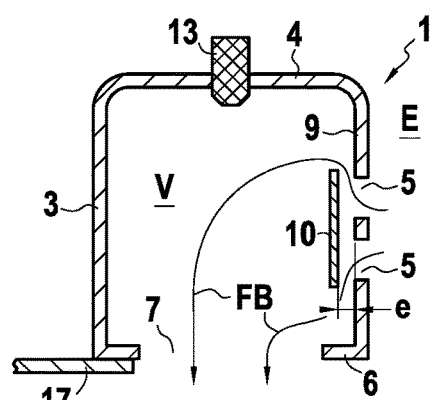

This produces the configuration shown in FIG. 5, where the admission ports 5 and the exhaust port 7 are all open. This configuration enables the sweeping stage to be performed in which fresh air is admitted and the burnt gas is swept away (arrows FB). After performing this sweeping step, the exhaust port 7 may be closed once more, and then a new combustion step may be initiated, as described above.

It should be observed that, by using the elastically deformable tongue, the invention makes it possible to shut and to re-open the admission port(s) 5 in passive manner. Using such a tongue constitutes a system that is light in weight with flexible contact that presents good reactivity for opening and closing the admission ports.

Figure 6:
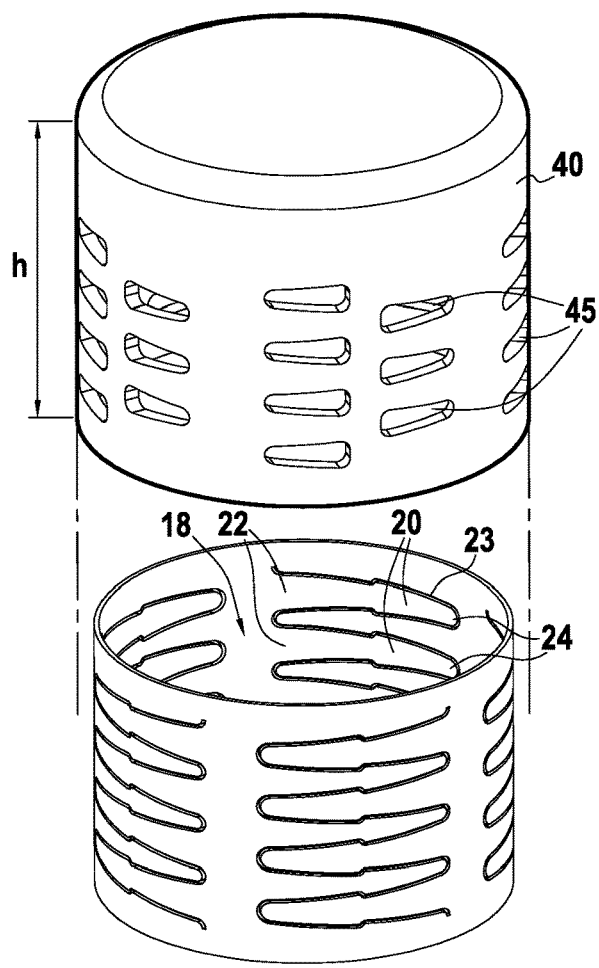
FIG. 6 shows a first example of an air admission sleeve and an associated combustion chamber enclosure suitable for use in the context of the invention.
Figure 7:
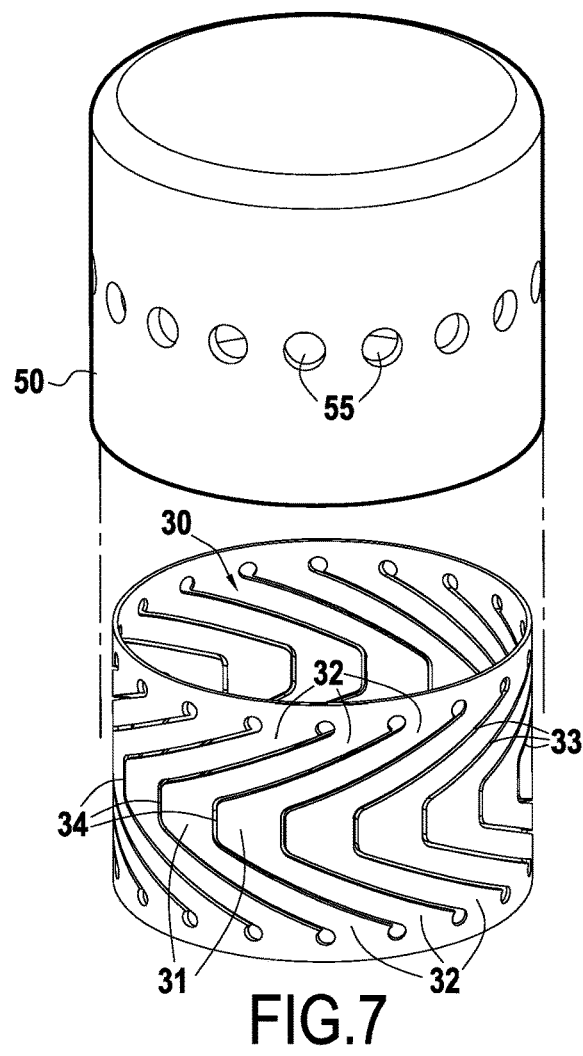
FIG. 7 shows a second example of an air admission sleeve and an associated combustion chamber enclosure suitable for use in the context of the invention.

FIGS. 6 to 7 show tongue variants 20 and 31 suitable for managing the admission of air into the chamber on the same principle. In these examples, the tongues 20 and 31 are defined by respective slotted portions of an air admission sleeve 18 or 30, which is placed inside the chamber.

FIG. 6 shows a first example of elastically deformable tongues 20 that are formed by slots 22 made in an air admission sleeve 18. The sleeve 18 is inserted inside the chamber 1. The sleeve 18 may be inserted as a force fit inside the chamber. The thickness of the sleeve 18 may be substantially constant. The slots 22 are made by an operation of cutting the sleeve 18. The cutting may be performed by laser cutting or by water jet cutting.

In the example shown, the sleeve 18 may have a plurality of slots 22 that are distributed around the inside volume of the chamber. Nevertheless, it would not go beyond the ambit of the invention for the sleeve 18 to include only a single slot 22. In this example, each slot 22 defines a plurality of tongues 20. In this example, the tongues 20 formed by a single slot 22 are distributed along the height h of the chamber.

Each tongue 20 has a first end 22 formed integrally with the sleeve 18 and that is stationary relative to the inside wall of the chamber. Each tongue 20 also has a second end 24 that is free and movable relative to the inside wall of the chamber. In this example, the tongues 20 are elongate in shape along the circumference of the chamber. In this example, each slot 22 is substantially sinusoidal in shape (comprising a succession of troughs and of crests). The second end 24 of each tongue 20 is defined to be level with a trough or a crest. The circumferential wall 40 of the enclosure has a plurality of admission ports 45, each of which is situated facing a different tongue 20.

FIG. 7 shows a second example of flexible tongues 31 that are formed by slots 33 made in an air admission sleeve 30. As mentioned with reference to FIG. 6, the air admission sleeve 18 is inserted in the chamber, possibly as a force fit.

Each tongue 31 is defined between two adjacent slots 33. The slots 33 and the tongues 31 are distributed around the inside volume of the chamber. The second ends 34 of the tongues 31 may optionally be distributed regularly around the inside volume V. The first ends 32 of the tongues 31 are made integrally with the sleeve 30. The admission ports 55 in the circumferential wall 50 of the enclosure are likewise positioned facing the tongues 31. In this example, the slots 33 are bell-shaped.

The above-described combustion system may be adapted to feeding gas to a turbine engine. The gas generated by the combustion system may serve to feed a turbine, such as an aeroengine turbine. The light weight of the valve system of the invention makes this system particularly advantageous for use on board a vehicle such as an aircraft.

The invention claimed is:

1. A constant volume combustion system comprising:
   at least one combustion chamber having at least one admission port and an exhaust port, and
   at least one elastically deformable tongue made of ceramic matrix composite material forming an air admission valve, the tongue being present inside the chamber and being positioned facing the admission port, the tongue having a first end that is stationary relative to an inside wall of the chamber and a second end, opposite from the first end, the second end being free and movable relative to the inside wall,
   wherein the tongue is defined by at least one slot formed in an air admission sleeve positioned inside the chamber.

2. The constant volume combustion system according to claim 1, wherein the chamber comprises a plurality of admission ports, each one of the plurality of admission ports facing a respective one of the at least one elastically deformable tongue.

3. The constant volume combustion system according to claim 2, wherein the chamber is defined by a circumferential wall and wherein the plurality of admission ports are formed through the circumferential wall.

* * * * *